United States Patent [19]

Weber

[11] Patent Number: 5,247,323
[45] Date of Patent: Sep. 21, 1993

[54] RELOADABLE CANISTER WITH REPLACEABLE FILM SPOOL

[75] Inventor: Frank D. Weber, San Diego, Calif.

[73] Assignee: Anacomp, Inc., San Diego, Calif.

[21] Appl. No.: 590,470

[22] Filed: Sep. 27, 1990

Related U.S. Application Data

[63] Continuation-in-part of Ser. No. 501,234, Mar. 29, 1990, Pat. No. 5,153,625.

[51] Int. Cl.$^5$ .............................................. G03B 1/18
[52] U.S. Cl. ........................ 354/173.1; 354/275; 352/78 C; 242/71.2
[58] Field of Search ............ 354/21, 173.1, 173.11, 354/212-218, 275; 242/71-73.5; 352/72-78 C

[56] References Cited

U.S. PATENT DOCUMENTS

| | | | |
|---|---|---|---|
| 3,730,453 | 5/1973 | Hotchkiss et al. | 242/191 |
| 3,734,052 | 5/1973 | Feldman | 116/114 |
| 3,977,776 | 8/1976 | Wagensonner et al. | 352/171 |
| 4,153,361 | 5/1979 | Axelrod | 354/275 |
| 4,174,888 | 11/1979 | Hunn et al. | 352/170 |
| 4,418,994 | 12/1983 | Gottshalk et al. | 352/78 R |
| 4,443,077 | 4/1984 | Tanikawa | 354/275 |
| 4,627,695 | 12/1986 | Beauviala et al. | 352/72 |
| 4,758,851 | 7/1988 | Zeth | 354/218 |
| 4,767,079 | 8/1988 | Saito et al. | 242/197 |
| 5,153,625 | 10/1992 | Weber | 354/275 |

FOREIGN PATENT DOCUMENTS

3715179 11/1988 Fed. Rep. of Germany.
63-013187 1/1988 Japan.

Primary Examiner—David M. Gray
Attorney, Agent, or Firm—Dressler, Goldsmith Shore, Sutker & Milnamow, Ltd.

[57] ABSTRACT

A reloadable film canister includes a light-tight enclosure with an aperture for dispensing film therethrough. A spool of film may be loaded into the enclosure, and may be removed when the film is dispensed. In one embodiment of the invention, an encoder (field modulating) disk is included as part of the canister. In another embodiment the encoder disk is affixable to the film spool and loadable with the film spool into the canister. The spool is mountable in the enclosure for rotation therein and for dispensing, at each step of a stepper motor, a predetermined length of film corresponding to the motor's step size. The encoder disk has a plurality of uniformly-spaced, peripherally-arranged segments (elements) detectable by an external detector (sensor), the detector and the stepper motor operating under control of a microprocessor. Upon rotation of the spool and dispensation of film, the disk provides information, via the detector, to the microprocessor enabling the microprocessor to determine, from the number of motor steps and number of segments detected during rotation, the diameter of the film roll and the length of undispensed film remaining in the canister.

27 Claims, 8 Drawing Sheets

RELOADABLE CANISTER WITH REPLACEABLE FILM SPOOL

RELATED APPLICATION

This application is a continuation-in-part of patent application Ser. No. 07/501,234, now U.S. Pat. No. 5,153,625, entitled "FILM CANISTER TO FACILITATE DIAMETER SENSING," filed Mar. 29, 1990, by Frank D. Weber.

BACKGROUND OF THE INVENTION

This invention relates generally to film-monitoring systems and, particularly, to a reloadable film canister with a replaceable spool insertable into the canister for storing and dispensing film. The spool and/or canister may be packaged as a unit, or as part of a system for indicating the diameter of film roll within the canister, for calculating and displaying the amount of film remaining in the canister, and for indicating the absence of film in the canister.

Accurate knowledge of the amount of film remaining in a film canister is important for camera systems used for computer output microfilm. These camera systems are typically connected either to a host computer, a magnetic tape drive, or some other equipment which has stored blocks of data which are to be printed on the film by the camera system. These data blocks vary in size and anywhere from a few feet to several hundred feet of film may be required to print the data. It is important to know the length of film remaining in the canister before the printing of a block of data is started so that there is enough film in the canister to print the block. This will allow the user to load a new full roll of film rather than have to splice the film in the middle of a data block.

Another reason it is important to accurately know the length of film left because some applications require that a substantial length of film be left unprinted at the very end of the film to facilitate threading into developer equipment. The accurate knowledge of length of film left allows the camera system to automatically stop when a predetermined amount of film is left and therefore prevent the loss of data due to exposure to light during the threading process.

Determining the amount of film in a film canister has either been inaccurate or inconvenient with prior art devices. One device that visually indicates on the side of the canister the amount of film left in the canister incorporates a lever mechanism which contacts the outside of the film roll. This provides only a relative reading with poor accuracy. The operator must stop the camera system and open the film bay area to read the amount of film left. This causes waste by exposing unprocessed film.

A second device is a meter-only system which allows for the display of film left information on an external device such as a CRT screen. It uses metered feed rollers to determine the amount of film removed from a canister having a predetermined starting length of film. This system simply subtracts the amount of film metered out from the known starting length. This method, due to accumulating metering errors, provides relatively poor accuracy as the canister approaches empty. The accuracy of this method also can be seriously degraded by "soft" errors of the system (hardware or software) which lose blocks of metering data. Additionally, this method is inconvenient because canisters are sometimes removed before the film in them is used up. This requires that the amount of film left in a partially used canister, as determined by the metering system, be written on the canister. The recorded length of film remaining in the canister must be manually entered into the system when that canister is inserted or reinserted.

A third device is described in U.S. Pat. No. 3,730,453, entitled "EARLY END TAPE DETECTION," issued May 1, 1973, to inventors S. E. Hotchkiss, B. H. Smith, and P. L. Stefko. This device provides a means (an output signal) for identifying when a predetermined position is reached on a tape. Each predetermined position signifies that a predetermined quantity of tape remains for use. The device detects changes in angular velocities of a tape supply reel as tape is dispensed from the reel, and produces the output signal when the changing angular velocities (expressed in terms of pulse periods) become equal to a predetermined angular velocity (reference pulse period) when the predetermined position is reached on the tape. This device does not provide for determination of the length-of-tape (or film-)—left without the use of factors such as predetermined pulse periods, derived from predetermined positions, it does not have the capability to provide for continuous readout of the length of film left.

Because it works on the principle of changing angular velocity, this method requires high accuracy in spindle drive velocity, in the reference frequency, and in operation of the comparator circuitry, and creates problems in applications (such as camera systems) where the medium (tape or film) needs to start and stop frequently, accelerating and decelerating through an entire range of angular velocities. Furthermore, this device should not be used for dispensing photographic film because it provides no means for shielding the film from ambient light. Even if the device were surrounded by a light-tight enclosure, the film, most likely, could not be loaded without risk of exposure unless the lights in the room were turned off. Also, the light source for the photodetector could fog the film.

SUMMARY OF THE INVENTION

It is an object of this invention to provide a film storing and dispensing canister which has a simple and accurate means for indicating the diameter of the film stored therein and means for indicating when a canister is out of film. The film canister consists of an enclosing shell formed of light opaque, non-electrically conductive material with a rotatable spool core or hub, which has film wound on it forming a film roll, mounted inside and has a field modulating disk as part of the spool or mounted to it on one side. The disk would typically be maintained inside the canister to prevent handling damage, but could alternatively be mounted on the outside.

When incorporated in a system for employing the indicating means, which system includes a sensor, a metered feed roller assembly powered by a stepper motor, and a digital computer (microprocessor), together with the canister, the system can measure the diameter of the film roll from which it calculates and displays the length of film left in the canister.

The sensor, typically located externally of the canister, detects the completion of each rotation of the spool while a metered feed-roller assembly pulls the film from the canister in a precise fashion. This provides a means for measuring the length of film being fed out of the canister for each rotation of the spool.

The diameter of the film roll is calculated by a digital computer using the fundamental relationship between the diameter and circumference of a circle. The accuracy of this calculation is limited only by the accuracy of the metering roller and is independent of feed rate, timing, or canister construction tolerance. The use of a digital computer facilitates the determination of a film-out condition and allows for compensation for various factors including the ability to average as many readings as necessary to eliminate the effect of random errors. Given the spool core diameter and the film thickness, a digital computer can easily calculate the length of film left on the spool.

The canister employed in the system may be of the disposable type (wherein the film, the film core and, optionally, the field modulating disk, are permanently sealed within the enclosure). This configuration eliminates the need for the user to load the film in the canister (which would require a dark room or glove box).

Alternately, the canister may be of the reloadable type, wherein the film package is provided separately from the canister. These are assembled together in a dark environment by the user. This configuration allows the canister to be reloaded (with subsequent new film packages as each film package is used up) and re-used.

In one canister/film-package configuration, the field modulating disk would be provided as part of the film package and would be affixed to the core or hub upon which the film is wound. This configuration would be easy to load.

In a second configuration, the disk would form an integral part of the canister, and the film package would be separate. The film package would consist of a core upon which film is wound. The core has at least one keyway or rib or spline, through which or by which to engage the disk so that they turn together when film is dispensed.

In a third configuration, the disk is shown as a separate item not permanently affixed to either the core or the canister, but is assembled to the core and to the canister, or is attached to the outside of the canister by means of a connecting shaft.

The film package for any of these configurations is provided in a light-tight bag, and a removable label containing the bar code information is affixed to the bag. After the film is transferred from the bag to the reloadable canister (in a dark room or other dark environment), the label is re-affixed to the outside of the reloadable canister.

As indicated above, each film package (spool of film) has a core (hub) portion with a roll of film wound thereon for dispensing, at each step of the stepper motor, a predetermined incremental length of film corresponding to the motor's step size and feed roller diameter. The disk, which may be affixed to the core or to the canister, has a selected number of detectable segments usable by the computer for determining, from the number of motor steps and the number of segments detected during rotation, the diameter of the film roll and the length of undispensed film remaining unused on the core of the spool.

BRIEF DESCRIPTION OF THE DRAWINGS

The objects, advantages and features of the invention will be more readily perceived from the following detailed description when read in conjunction with the accompanying drawings, in which.

DESCRIPTION OF THE PREFERRED EMBODIMENTS

Figure 1:
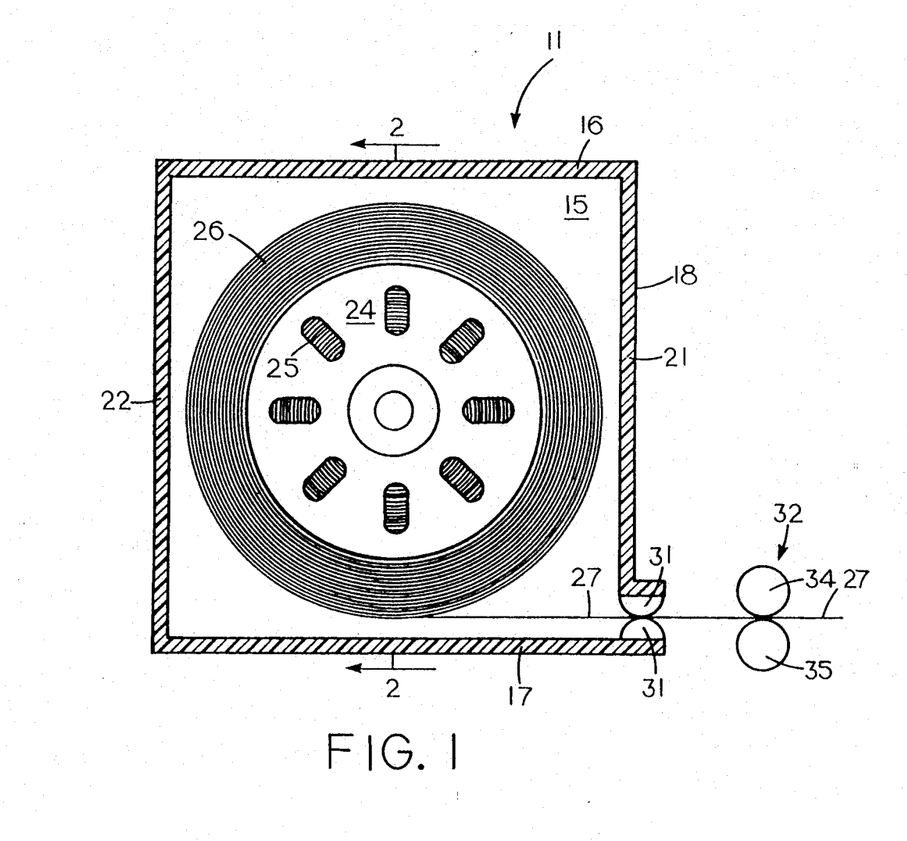
FIG. 1 is a sectional side view of a disposable film canister constructed in accordance with the invention.
Figure 2:
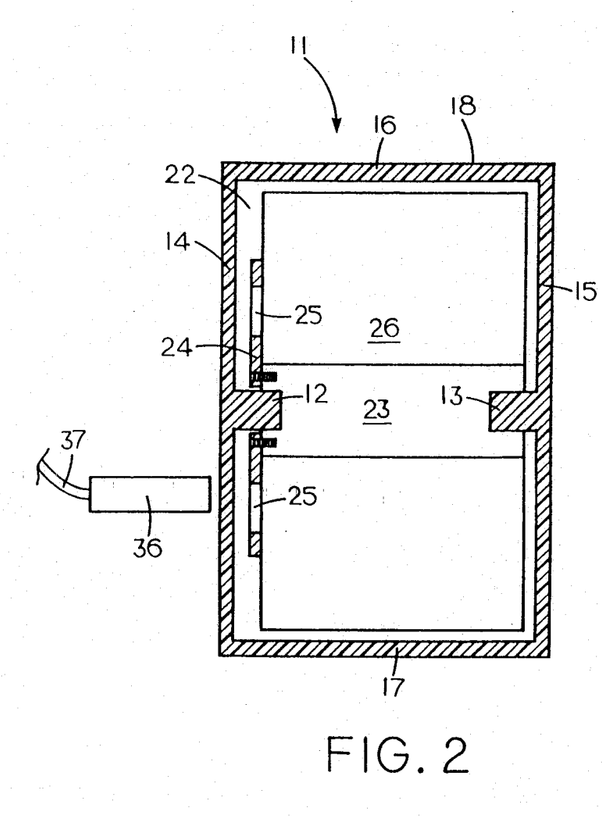
FIG. 2 is an end sectional view taken along cutting plane 2—2 of FIG. 1.

With reference now to the drawing, and more particularly to FIGS. 1 and 2 thereof, there is shown film canister 11 having internal hubs 12 and 13 projecting inwardly from front and back sides 14 and 15 respectively of enclosure shell 13. The rectangular canister or film box is completed by top and bottom walls 16 and 17 and end walls 21 and 22. In actuality the canister will be formed of two or more segments which are assembled around the film roll in a light tight shell which is continuous except for the exit slot defined by sealing elements 31. Further, the canister may have any appropriate shape other than rectangular.

Typically the canister shell would be entirely made of electrically non-conductive material, such as a thermoplastic, so as to allow the unimpeded transmission of (non-visible) electromagnetic fields to the field modulating disk. However, this limitation would not apply if the disk is mounted outside the canister. Further, the above limitation is actually only necessary in the immediate vicinity of the location of the external sensor, so that the remainder of the canister could be made of any light opaque material.

Rotatably mounted to projections 12 and 13 is spool core 23. The mating rounded surfaces of the projections and the spool provide appropriate bearing surfaces. The film tension during feed and the roll over-travel at the end of a feed cycle can typically be controlled by proper selection of hub projection material and diameter without the need for any external spindle, drive or brake means, or any additional internal friction reducing means. However any of these could be employed where more precise tension is required.

Mounted on one end of spool 23 is field modulating disk 24. This disk is shown as being made of metal formed with spaced cutouts 25. The metal between the cutouts modifies an electromagnetic field and causes a change of state in a sensor. The disk could alternatively be made of a non-conductive substance having conductive elements attached thereto, equivalent to the space between cutouts 25. Disk 24 could be formed integrally with the spool. Other construction of the disk are also possible. For example, the disk could be made or surfaced with a conductive material with recesses, discontinuities or convolutions that act like cutouts. The important feature is that, rotating with the spool core and film roll at a radius corresponding to where a sensor can be placed and within close proximity to the sensing location are two or more areas of differing interactivity with an external electromagnetic field, the transition of which may be detected by a sensor. It should be noted that for purposes of this invention, only one cutout or sensor interrupt is required by several are shown as they may be usefully employed to provide an average of multiple readings in a time efficient manner. Cutouts 25 are only as wide as necessary to have a transition from conductive to non-conductive which is detectable. It need only be a fraction of the angular width of the disk. Likewise the spaces between the cutouts need only be wide enough for the sensor to detect a transition from non-conductive to conductive.

Figure 4:
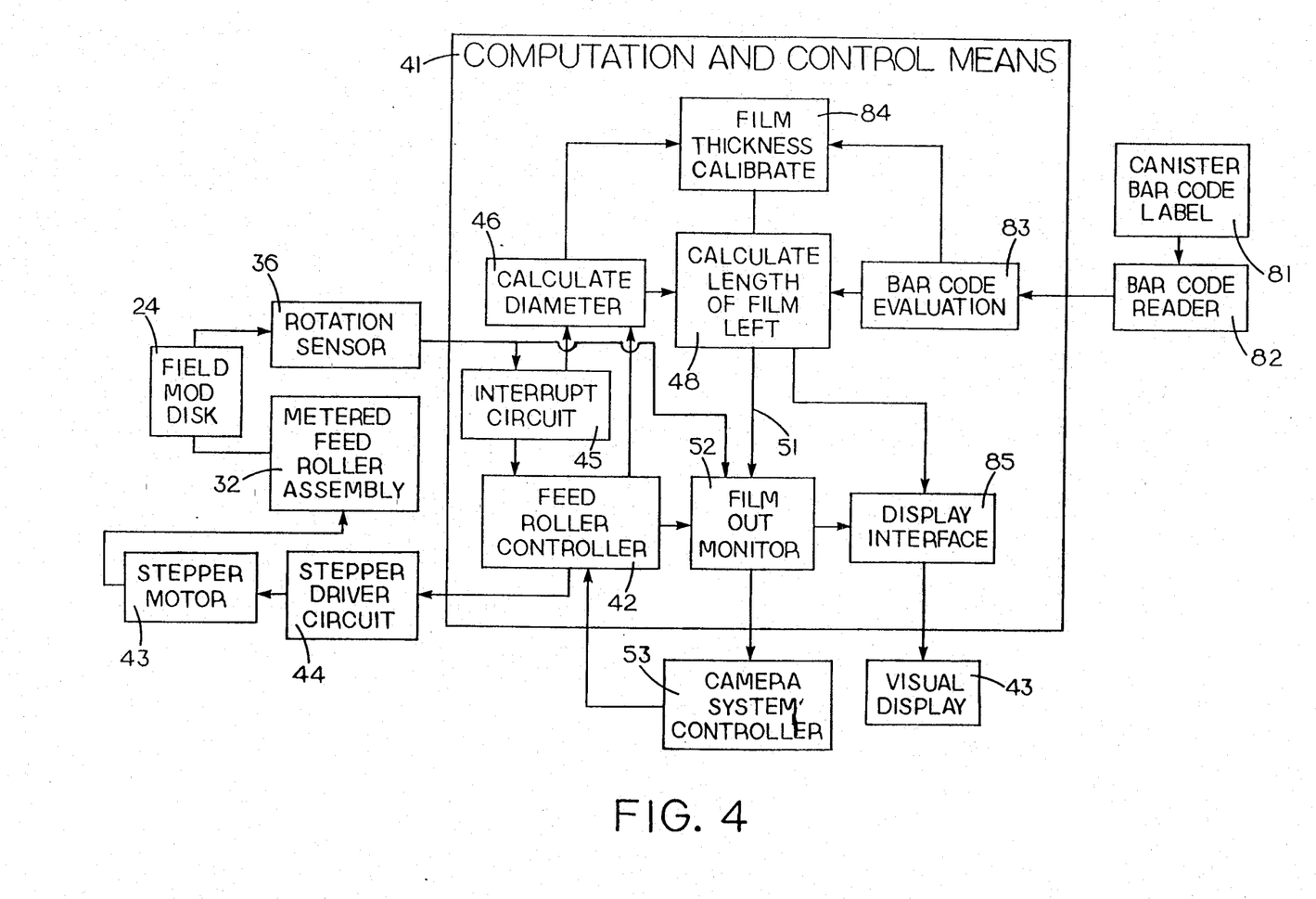
FIG. 4 is a block diagram of the sensing and calculating means of the invention.

Wound on spool 23 is film roll 26 which is pulled out of the canister as film 27 through light sealing elements 31 by metered feed-roller assembly 32. The feed-roller assembly comprises rollers 34 and 35, one of which has a known, accurate circumference and is coupled to stepper motor 43 which is driven by stepper motor drive circuit 44 (FIG. 4). Positioned externally of canister 11 is sensor 36 electrically connected to appropriate calculating means through wire 37 (see FIG. 4).

Sensor 36 may be of the inductive type which generates an oscillating magnetic field. When the conductive areas of disk 24 get close enough to the sensor, the change in magnetic field causes electrical eddy currents to flow in the disk material. This causes a change, such as a reduction in the amplitude or the frequency, or both, of the oscillating field, which results in a change in output voltage of sensor 36. As film is pulled out of the canister by the metered feed-roller assembly, the film roll and field modulating disk are rotated together. The spinning disk alternately presents conductive (or electromagnetically reactive) and non-conductive (or electromagnetically non-reactive) areas in proximity with the sensor. Every time there is a transition from non-conductive to conductive areas of the disk, that is, at the trailing edge of a cutout, for example, the sensor is activated and it causes an interrupt of the computer. When the disk continues to rotate so that no conductive areas are near the detector the computer interrupt is reset. Because the canister is made of opaque, non-conductive materials, it provides an effective light seal but does not interfere with the detector field in this situation. As stated above, the computer uses the length of film metered out by the feed-roller assembly between interrupts to generate a number which is proportional to the diameter of the film roll in the canister.

Figure 3:
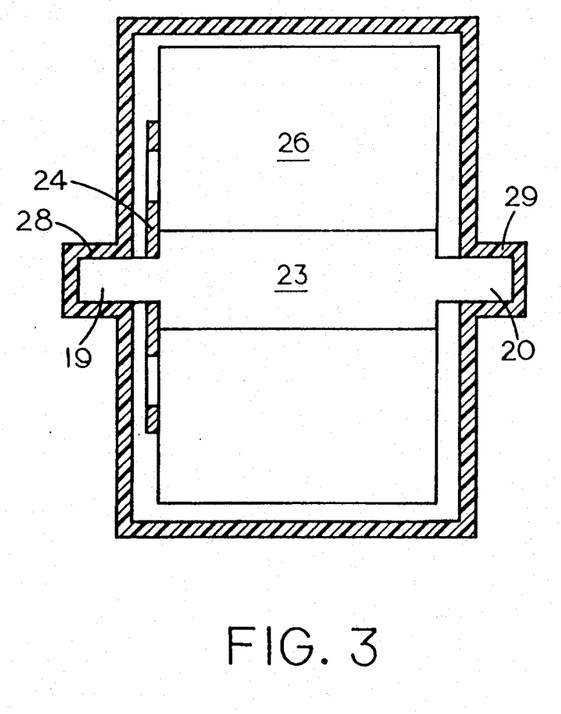
FIG. 3 is an end sectional view similar to FIG. 2 of an alternative embodiment of the canister.

An alternative embodiment of the film canister is shown in FIG. 3. It functions in a manner identical with the canister of FIGS. 1 and 2 but the hub configuration is different. Core 23 is formed with hub extensions 19 and 20 which extend into canister projections 28 and 29 respectively. The bearing structures permitting relatively free rotation of the core and film roll in the canister are the same or equivalent to those already discussed.

Figure 3A:
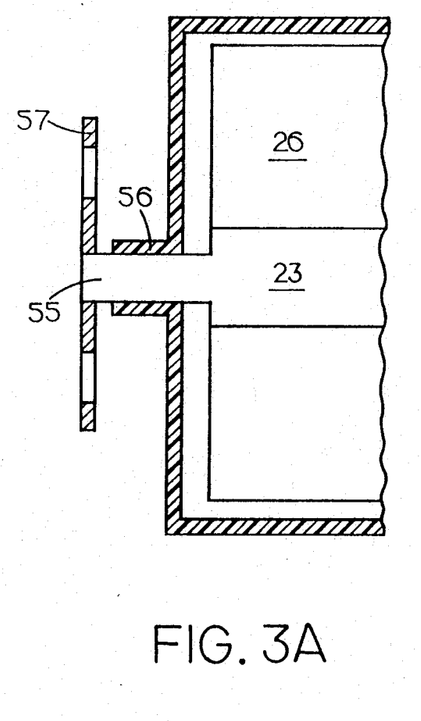
FIG. 3A is a partial sectional view similar to FIG. 3 showing an alternative embodiment of the disk and hub configuration.

FIG. 3A shows a disk and hub configuration for the canister which connects the external disk for rotation with the inner spool. Hub 55 is extended further through canister projection 56. A light tight seal is provided between hub 55 and projection 56 by conventional means. Disk 57, configured with segments to provide a sensor with signal changes, as before, is secured to hub 55 in some appropriate way for rotation therewith. This enables optical position detection for the rotating disk, in addition to other types of detection by appropriate sensor means.

The system for calculating the diameter of the film roll and the amount of film remaining on the spool is shown in FIG. 4. Computation and control means 41 is typically a microprocessor. The microprocessor logic modules include feed roller controller 42 which controls the metered feed-roller assembly 32 through stepper driver circuit 44 and stepper motor 43 based on directives received from camera system controller 53. This meters a given amount of film through the metered feed-roller assembly which pulls film from the film roll, causing the field modulating disk to turn. The field modulating disk causes the rotation sensor to change output state as conductive area transitions pass by.

Interrupt circuit 45 generates a program interrupt signal when a leading (or, alternatively, a trailing) edge of the sensor output signal is detected. Upon detecting this program interrupt the feed roller controller provides to diameter calculation means 46 the number of steps that the film has been fed since the last interrupt. The diameter of the film enclosed within opaque canister 11 is provided by the following equations:

$$D = \frac{C_R}{\pi} \quad (1)$$

$$C_R = \frac{NC_F}{S} \quad (2)$$

where

D is the diameter of the film roll, $C_R$ is the circumference of the film roll and is equal to the length of film metered out for one full rotation of the field modulating disk, N is the number of motor steps driven for one rotation of the field modulating disk, S is the number of motor steps for one revolution of the motor, and $C_F$ is the circumference of the feed roller.

Calculating element 46 utilizes an algorithm based on Eqs. 1 and 2 that uses the average of the feed lengths from complete revolutions of each of the multiple slots of the field modulating disk. The averaging of multiple revolution data greatly reduces the error caused by random sensing variations. The use of only full revolution data in the calculations eliminates errors due to tolerances in field modulating disk construction. The logic used by element 46 to accurately calculate the film roll diameter, the length of film left, and to compensate for roll coast is given in the "Logic For Roll Diameter and Length Left Calculation" section below.

Bar codes are widely available to provide information and film canisters are no exception. Useful pertinent information about the canister and the film mounted in it is represented on bar code label 81 (FIG. 4) which is read by conventional bar code reader 82. Bar code evaluation circuit 83, which may be a logic module in the microprocessor, provides to film left calculator 48 information regarding several canister variables. This is done by analyzing two information fields within the number read from the canister bar code when a film canister is first placed in the camera system. The film type field identifies the core diameter, full film length and nominal film thickness. The unique canister identification field is compared with the identification numbers stored for previously used canisters to determine if the canister has been used before and has a calibrated film thickness value stored. If so, it provides that information to calculate block 48. If not, it provides canister variable information to film thickness calibrate block 84 which is enabled for that purpose.

Lot-to-lot variation in film thickness can be a significant source of error in estimating the length of film left (using Equation 4 below) for canisters that are nearly full. While this error goes to zero as the film is used up, an algorithm is provided which greatly reduces this error based upon knowledge of full canister film length.

Film thickness calibrate block 84 calculates the calibrated film thickness from the full film length and the roll diameter provided by calculate block 46 employing the equation:

$$t = \frac{\pi}{4L_f}(D^2 - d^2) \quad (3)$$

where t is the calibrated film thickness,
$L_f$ is the full roll film length, and
d is the core diameter.

The calibrated film thickness value is automatically stored in non-volatile memory.

Length-of-film left block 48 uses the roll diameter provided by block 46, the core diameter provided by bar code evaluation block 83, and the film thickness provided by either bar code evaluator 83 or film thickness calibrate block 84 to calculate the length of film left in the canister using the equation:

$$L = \frac{\pi(D^2 - d^2)}{4t} \quad (4)$$

where L is the length of film left.

This length left information is updated to display interface 85 after each interrupt, and can be displayed on visual display 43, which is typically a CRT. The length left value is stored in non-volatile memory whenever a canister is removed from the system.

Film out monitor 52 has two methods by which it detects a film-out condition. First, when all the film has been unwound from the core, the core and disk stop rotating. The system monitors feed roller controller 42. If more than a predetermined length of film is fed without an interrupt (from the rotation of the field modulating disk) being detected (indicative that the film has come loose from the core), a message is posted to the display interface which causes a film-out message to appear on the visual display. The camera is then stopped at the earliest convenient time by monitor 52.

The second film-out detection method is used, in conjunction with the first method, on those systems where the accuracy of the point where the film comes loose from the core is not as precise as the film left estimate. In this case film-out monitor 52 monitors the value of the film left on line 51 from calculator 48. When this value approaches a specific point where the film may start to slip on the core, film monitor 52 takes over the estimation of the length of film left by subtracting the amount of film fed by feed roller controller 42 from the last reliable film left value. When this estimate of film left goes to zero a film-out message is posted to the display interface and the camera is stopped. For situations where a substantial unprinted "tail" length of film is required, the film left estimate would be compared to the desired tail length instead of zero.

The first film-out detection method is needed in conjunction with the second in order to handle various circumstances such as when the operator changes to a different canister type (with a different core diameter) without notifying the system (through the bar code) of the change.

Employing the film canister to facilitate diameter sensing in this invention has several significant advantages over known prior art devices. It provides a simple and inexpensive means for indicating the diameter of the film on a spool in an opaque canister. The type of diameter indication used has inherently high accuracy, being insensitive to most manufacturing tolerances within the unit. Furthermore, it provides a positive film-out indicator, eliminating the need for auxiliary sensors for this purpose.

There are three basic configurations of the system of this invention to estimate the film left using the film canister to facilitate diameter sensing. Each of these configurations has distinct advantages over prior art systems and devices and shows the usefulness of a film canister containing a field modulating disk. The three configurations could be described as having the characteristics of (1): the complete system described above; (2) the complete system but without a canister bar code label and bar code reader; and (3) the complete system but without the bar code enhancement and without means for calibrating film thickness.

All three of these systems provide better accuracy than is provided by a lever mechanism incorporated with the film canister and they avoid opening the camera bay to determine the length of film left. Another advantage of the systems of this invention is that they prevent waste of film. None is lost by unintended exposure because there is no need to open the camera bay to check film length. Because the invention determines when the film on the core is at the end, no film is thrown away due to an unknown small amount of film which may remain, which could be the result with prior, less accurate film length determining systems. All of the embodiments of the invention allow for the elimination of a separate "film-out" sensor because it is able to detect when the film comes loose from the spool core and because of the inherently high film left accuracy when the film is nearly expended. All of these embodiments also permit removal and replacement of film canisters without writing down or reentering intermediate film-left data.

System (2) above additionally has superior overall film left estimating accuracy than a meter-only system. Because the film thickness calculation uses the predetermined full canister film length, it causes the accuracy of the output for a full (or nearly full) roll to be equivalent to a similar meter-only system. However, as film is removed from the roll of system (2) the accuracy can actually improve and is superior to a meter-only system because in this system there is no accumulation of feed-length errors. If the calibrated accuracy should be lost for some reason, the accuracy reverts to equivalence to system (3).

System (1) above eliminates the need by the operator (in system (2)) to specify the type of film and whether or not it is a full roll (for calibration) when a canister is placed in the camera system. This also allows calibration accuracy to be maintained if a roll is removed and replaced and allows the determination of the amount of film in a canister before it is placed in the camera system by reading the canister bar code and the last film-left data stored corresponding to the unique identification field for that canister. While a meter-only system could theoretically also incorporate a canister bar code and bar code reader, it would still provide inferior film-left accuracy, require an additional film-out sensor, and would be more susceptible to certain kinds of soft system errors that cause loss of metering data.

It was previously mentioned that the disk could be inside or outside the canister body. If it is outside, there are alternative sensing means which become available. For example, optical sensors could be used with an external disk. The means for coupling an external disk to the spool core could be a physical direct connection or a magnetic coupling, among others.

LOGIC FOR ROLL DIAMETER AND LENGTH LEFT CALCULATIONS

Figure 5:
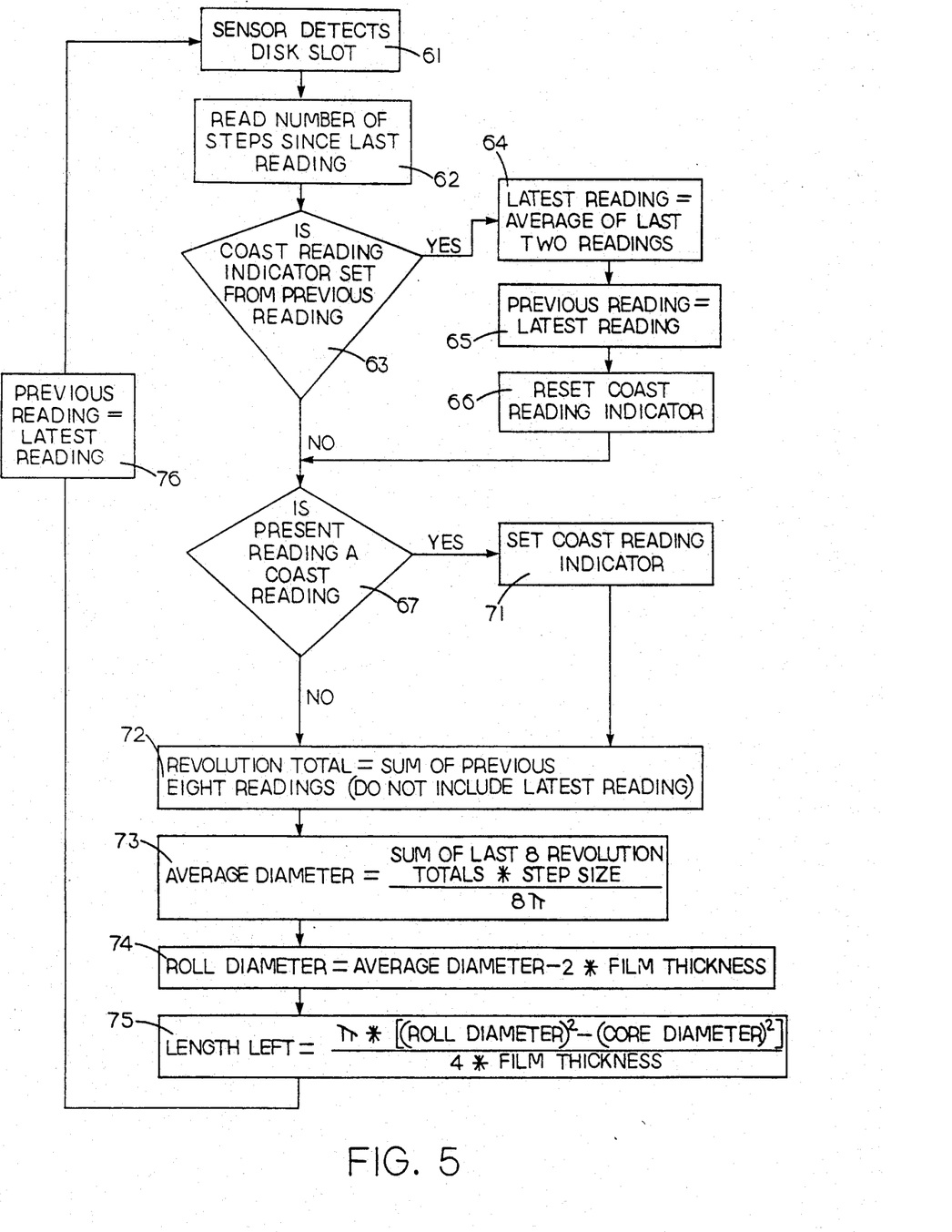
FIG. 5 is a logic flow diagram showing how roll diameter and length of film left are determined from input variables.

The flow diagram of FIG. 5 shows the flow of information between the variables used by calculating element 46 to give a highly accurate estimate of the roll diameter and the length of film left. With respect to FIG. 5, the assumption is made that there are eight encoder slots or predetermined detectable changes around the disk. The use of multiple slots allows for the averaging of more values sooner after start-up and hence more accuracy and early reduction of random errors. Using eight slots allows for the timely detection of a film out condition and assists in the elimination of coast errors by assuring that for the typical feed cycle of 148 mm any reading received during a coasting condition, due to roll inertia at the end of a feed cycle, will be followed by a good reading where film tension is maintained during a feed cycle.

Execution begins when sensor 36 detects a disk slot (step 61) when the disk is rotating. This provides an interrupt from circuit 45 to the system. The number of feed motor steps driven since the last detection is obtained from feed roller controller 42 in step 62. Steps 63–67 and 71 show the method used to reduce the error caused when a detection of a disk transition occurs after a feed cycle has stopped and the inertia of the roll has caused it to coast some unknown distance. This coast would cause the number of steps to be misleadingly low for this reading and high for the next following reading. Steps 64 and 65 average these two readings and set these readings equal to their average. Theoretically these values should differ by an amount corresponding to the difference in film roll diameters for these two different times. However, for typical values of film thickness and motor characteristics (steps per revolution) the reading difference would be less than one motor step and not significant. This logic requires that each reading be "buffered" or held back one cycle of logic, beginning at step 72, so that each reading can be processed with the next reading to correct for coast errors before any further calculations take place.

In step 72 each of the previous eight readings (read in the last eight logic cycles before the present reading) are added together in order to obtain the total number of steps for one full revolution of the disk.

In step 73 the last eight revolution totals (including the last) computed in step 72 during the last eight logic cycles are averaged and this average is multiplied by the distance the film moves for one feed motor step to obtain an average diameter. Because there are eight slots in the disk this average of eight revolution totals is obtained in just two rotations of the disk.

The average of the roll is calculated simply by the relationship:

$$D_{AV} = \frac{(StepSize)*(Sum\ of\ Last\ Eight\ Revolution\ Totals)}{8\pi} \quad (5)$$

where
"Step Size" (equal to $C_F/S$) is the length of film fed by the metered feed-roller assembly for one step of the feed-roller controller.

The estimated diameter of the roll at the instant of the last detection is obtained in step 74 by subtracting from this average the offset in diameter caused by one rotation of the disk (two thicknesses of film are removed from the diameter for each rotation).

The estimated length of film left on the roll is easily calculated in step 75 from the roll diameter as explained previously. This method for determining film roll diameter and film length reduces the need for precision in construction of the field modulating disk and at the same time it filters out random sensing and coast read errors.

ALTERNATIVE EMBODIMENTS

Figure 6A:
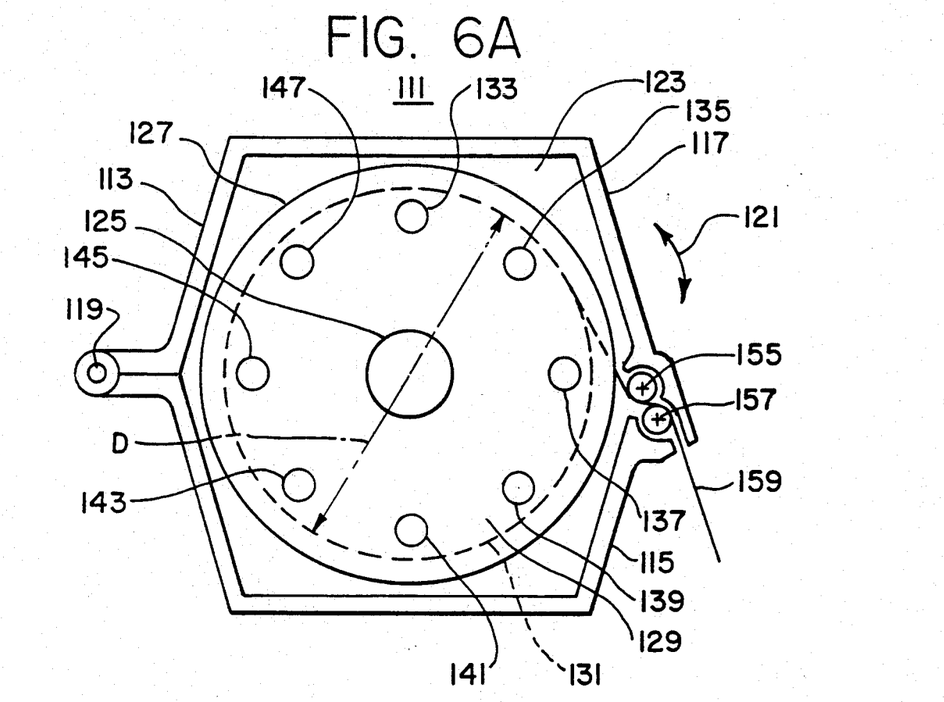
FIG. 6A is a sectional side view of a reloadable film canister having a replaceable spool constructed in accordance with the invention.
Figure 6B:
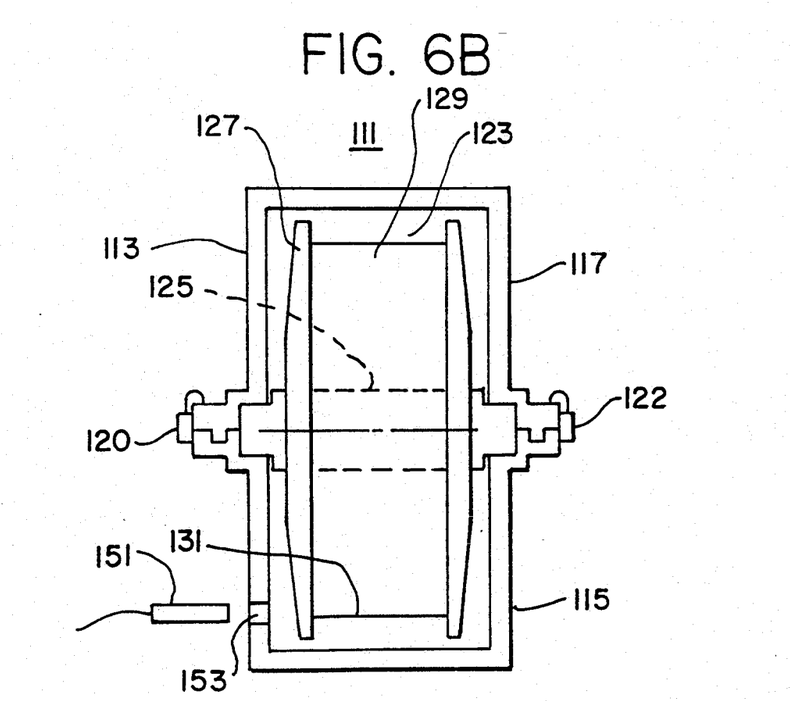
FIG. 6B is a sectional front view of the canister and spool shown in FIG. 6A.
Figure 7A:
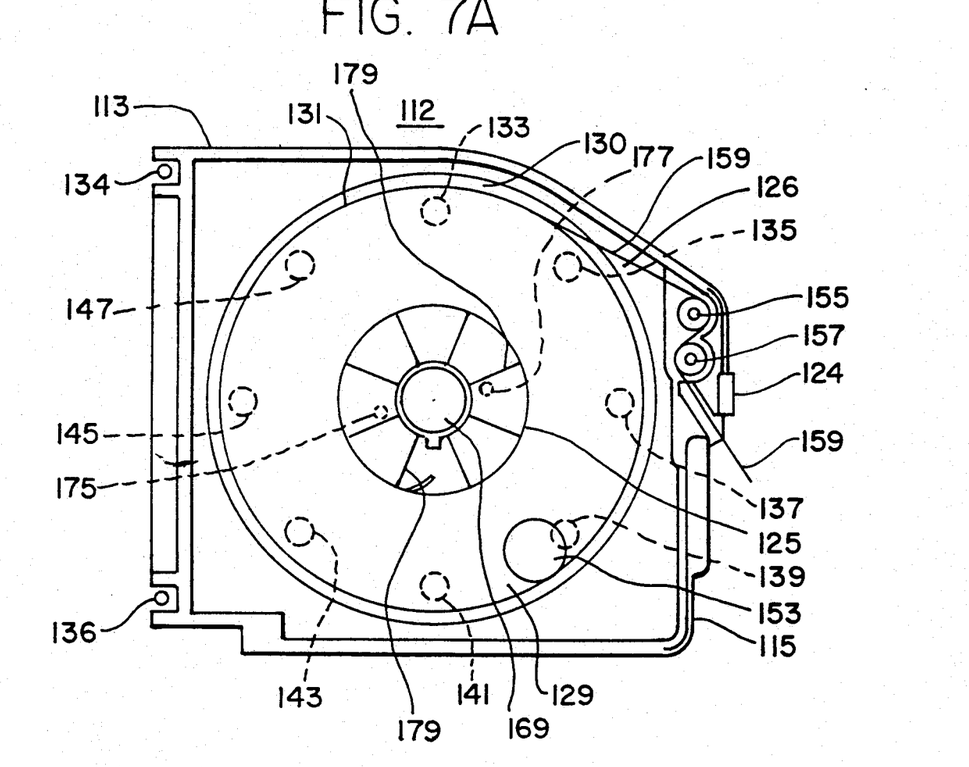
FIG. 7A is a sectional top view of an alternative embodiment of a reloadable film canister having a replaceable spool constructed in accordance with the invention.
Figure 7B:
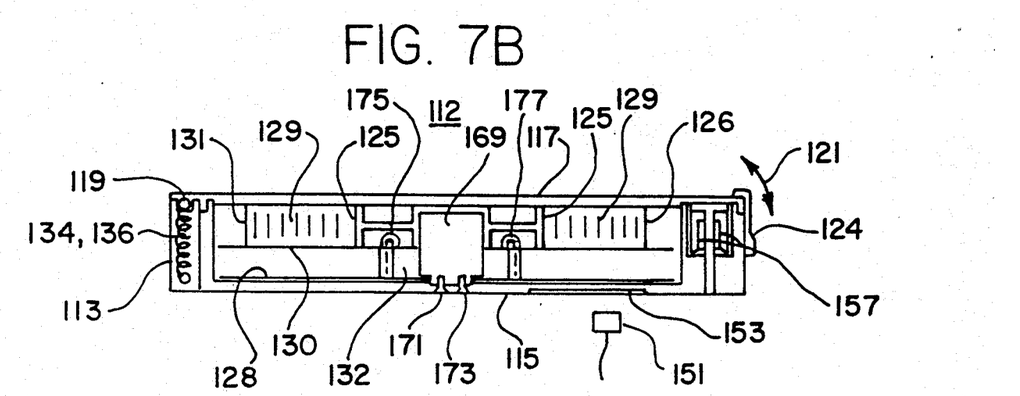
FIG. 7B is a sectional side view of the canister and spool shown in FIG. 7A.

Other embodiments of the system may feature the use of a reloadable film canister, such as the reloadable film canister 111 shown in FIGS. 6A and 6B (e.g., a 105 millimeter wide film canister), or reloadable canister 112 shown in FIGS. 7A and 7B (e.g., a 16 millimeter wide film canister).

Canisters 111 and 112 each includes a housing or enclosure 113 comprised of a lid or upper portion 117, and a mating or bottom portion 115 attached to the lid portion by a hinge 119. The lid may be opened and closed in the directions shown by arrow 121 permitting easy replacement (pull out, and insertion) of a spool of film in the canister. The enclosure of canister 111 includes two latches 120, 122, and the enclosure of canister 112 includes a latch 124, bridging the edges of both lid and mating portions, for latching (locking closed) said portions. The enclosure of canister 112 also includes two springs 134, 136, for biasing lid 117 to a closed position.

Figure 8:
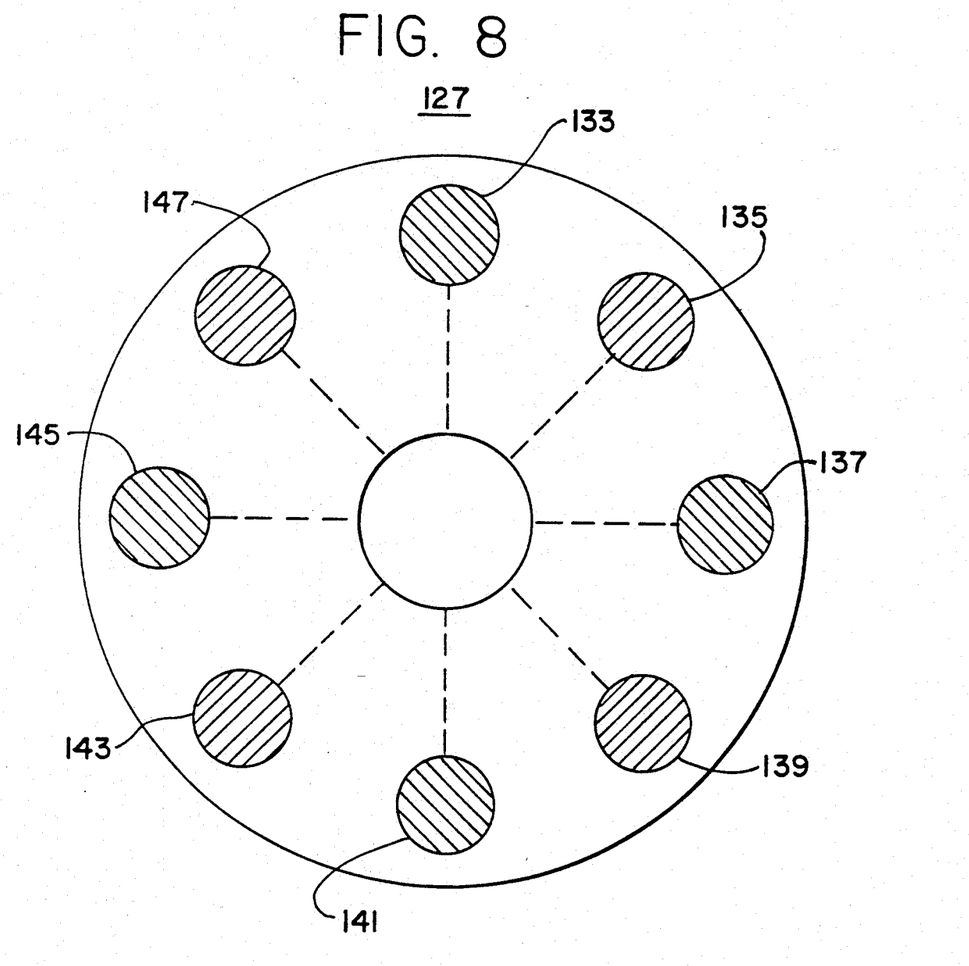
FIG. 8 is a diagrammatic illustration of an encoder disk incorporated in the spools of FIGS. 6A and 7A.

The spool 123 (FIGS. 6A, 6B) includes a core (hub) portion 125 with film 131, and a disk portion 127, whereas the spool 126 (FIGS. 7A, 7B) includes only a core portion 125 with film 131; the disk 128 (in FIGS. 7A and 7B) is fixed to the canister 112. A film 129 is wound on the core 125, forming a film roll 131 with a diameter D (FIG. 6A). Disk 127 (FIGS. 6A and 8) and disk 128 (FIG. 7A) each includes a plurality of uniformly-spaced peripherally-disposed segments (e.g., eight metallic elements/labels) 133–147 detectable by an electromagnetic sensor 151 (FIGS. 6B, 7B) via an opaque plastic window 153. The canisters 111, 112 each includes a pair of guide rollers 155, 157 (FIGS. 6A and 7A) for guiding film 159 therethrough to drive rollers of a stepper motor (not shown). The guide rollers direct the film through a circuitous path, forming a light-tight labyrinth. In the embodiment shown in FIG. 6A, one guide roller 155 is positioned in the top portion or lid 117 of the enclosure, and the other guide roller 157 is positioned in the bottom portion of the enclosure. This allows for easy loading and threading of film, and easy access for cleaning the rollers.

Alternatively, a spool of film usable in a reloadable canister can be formed with a core, such as the core 125. This core can be journable in the canister, such as the canister 111, with a roll of film 129 wound thereon.

The roll of film has an edge with a measurable diameter. The diameter decreases as the roll rotates and film is dispensed.

A disk carrying an azimuthal encoder with uniformly spaced, detectable elements is mounted on an end of the core. The elements are capable of providing information for determining the length of undispensed film remaining on the core.

Figure 9A:
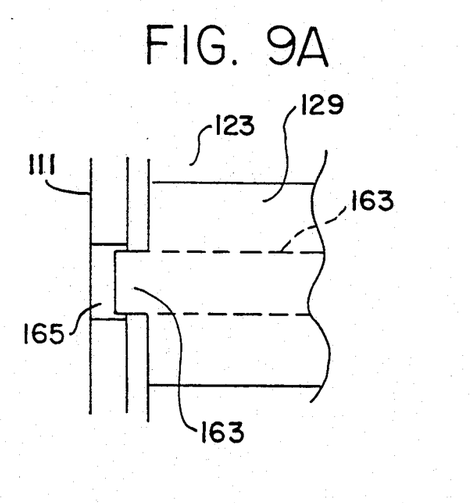
FIGS. 9A–9D are diagrammatic illustrations showing how the replaceable spools of the present invention are journaled in a wall of the canisters of FIGS. 6A, 6B, 7A, and 7B. (For purposes of clarity, the encoder disk is omitted from FIGS. 9A–9C.)
Figure 9B:
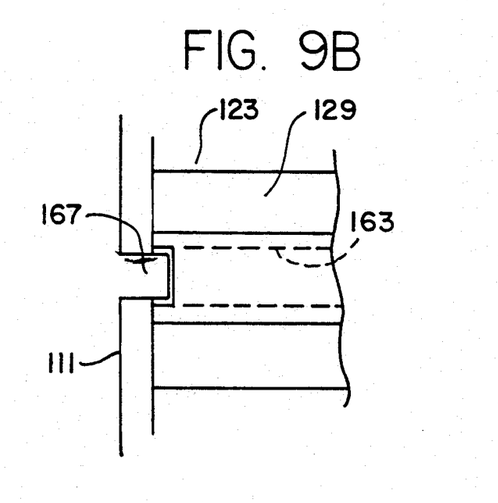
Figure 9C:
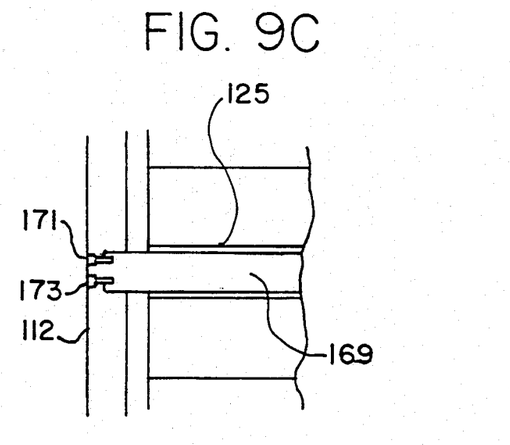
Figure 9D:
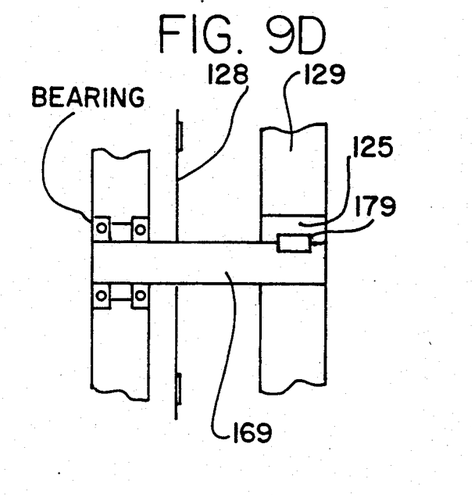

As shown in FIGS. 6B, 9A and 9B, the spool 123 of film 129 may be journaled (i.e., mounted for rotation) in the canister 111, with the spool fitting into a recess or groove 165 (FIG. 9A), or fitting onto a hub 167 (FIGS. 6B and 9B) of the canister. Alternatively, as shown in FIGS. 7A, 7B and 9C, the core 125 may form a sleeve 128 for rotation on a shaft 169, the shaft being secured to the canister 112 by screws 171, 173. Also, as shown in FIG. 7B, a flange 130 may be mounted for rotation on the shaft 169, the flange being separated from the encoder disk 128 by a spacer 132. The flange is useful in preventing the film 129 from telescoping (progressively skewing) on the core 125 during rotation of the spool. Telescoping could cause the film to jam in the canister. In FIG. 7B, the flange 130 is shown to include a projection (finger or screw head) 175 (and an optional projection 177) for mating with and engaging one or more ribs 179 (FIG. 7A) of the core 125 when the film spool is inserted onto the shaft 169 (FIGS. 7A and 7B). This flange-core (projection-rib) structure eliminates the need for more complex structures for coupling the film core to the flange and encoder disk.

In view of the above description, it is likely that modifications and improvements will occur to those skilled in the art which are within the scope of the accompanying claims. For example, under some circumstances it may be possible or desirable for the sensor to be located integrally within the shell.

While the present invention is susceptible of embodiment in various forms, there is shown in the drawings and described in the specification certain preferred embodiments, with the understanding that the present disclosure is to be considered as an exemplification of the invention, and is not intended to limit the invention to the specific embodiments illustrated.

What is claimed is:

1. A film reel removably mountable in a canister with an output slot for dispensing, at each step of a motor, a predetermined length of film from the slot, the film reel comprising:

a core having a roll of film thereon; and a disk affixed to said core for rotation therewith, said disk having a plurality of uniformly-spaced, peripherally-disposed, detectable elements capable of providing information for determining, from a number of motor steps and a number of elements detected during rotation, the diameter of the film roll and the length of undispensed film remaining on said core; and means carried on said core for rotatably and removably engaging the canister wherein said core is removably insertable into the canister with the film extendable through the slot.

2. The film reel of claim 1, wherein the disk is segmented such that, for a maximum diameter (D) of film on the core, the length (l) of dispensed film is related to number (n) of segments detected during rotation, as follows:

$$n \geq \frac{\pi D}{l}$$

3. A film reel insertable into a reloadable canister, the reel comprising:

a core journable in the canister for rotation therein, the core having film wound thereon forming a roll, the roll having an edge of measurable diameter, the diameter decreasing as the roll rotates and film is dispensed; and a disk mounted on an end of the core for rotation therewith in the canister, the disk having an azimuthal encoder with uniformly-spaced detectable elements capable of providing information for determining the length of undispensed film remaining on the core.

4. A reloadable film canister, usable with a roll of film wound on a removable core and with a stepper motor for dispensing, at each step of the motor, a predetermined length of film, the canister comprising:

a light-tight enclosure having an opening for passage of film therethrough to the stepper motor; and a disk mounted therein for rotation with the removable core, the disk having a plurality of uniformly-spaced, peripherally-disposed detectable elements capable of providing information for determining, from a number of motor steps and a number of elements detected during rotation, the diameter of the film roll and the length of undispensed film remaining on the core.

5. A reloadable film canister usable with a stepper motor for dispensing, at each step of the motor, a predetermined length of film, the canister comprising:

a light-tight enclosure having a supporting structure therein and having an opening for passage of film therethrough to the stepper motor; and a replaceable spool mounted on the supporting structure for rotation thereon and having a core and a disk for dispensing film therefrom, the core having a roll of film thereon and the disk having a number of uniformly-spaced, peripherally-disposed detectable segments capable of providing information for determining, from number of motor steps and number of segments detected during rotation, the diameter of the film roll and the length of undisposed film remaining on the core of the spool.

6. The canister of claim 5 wherein the enclosure includes a lid portion and a mating portion, the lid and mating portions being hinged for easy opening and closing, and loading and unloading the canister.

7. The canister of claim 6 wherein the supporting structure is a recess in each of the opposing sides of the enclosure.

8. The canister of claim 6 wherein the supporting structure is a hub on at least one side of the enclosure.

9. The canister of the claim 6 wherein the supporting structure is a shaft affixed to the enclosure, and the core is a sleeve rotatable on said shaft.

10. The canister of claim 6 wherein the lid and mating portions of the enclosure each includes a roller for passage of film therethrough.

11. The canister of claim 6 wherein said canister includes a latch and at least one extension spring for maintaining the light-tightness of the canister.

12. The canister of claim 6 wherein the supporting structure includes a shaft affixed to the enclosure for rotation of the disk thereon.

13. A reloadable film canister to facilitate determination of length of film remaining after any usage and having a positive film-out indication means, said canister comprising:
- a light-tight enclosure shell having a film output slot;
- a disk having at least one element thereon detectable by means of a sensor;
- bearing means facilitating free rotation of said disk within said shell;
- means for coupling said disk to a roll of film for rotation therewith;
- wherein said enclosure shell is formed of opaque non-conductive material; and
- wherein said opaque non-conductive shell has an opaque plastic window formed through a portion thereof for facilitating detection by the sensor of modulation of electromagnetic radiation caused by the disk.

14. The reloadable film canister recited in claim 13, wherein said disk is made of metal and is formed with at least one non-conductive segment, the transition between said segments being detectable by the sensor.

15. The reloadable film canister recited in claim 13, wherein said disk is made of non-conductive material and has at least one conductive element secured to the side thereof.

16. The reloadable canister recited in claim 13, wherein said detectable element is radially disposed from the center of said disk.

17. The reloadable canister recited in claim 13, wherein said disk is formed with surface discontinuities which are detectable by the sensor.

18. The reloadable film canister recited in claim 13, wherein said disk is formed with surface convolutions which are detectable by the sensor.

19. The reloadable film canister recited in claim 13, wherein said disk has a plurality of said detectable elements arranged radially around the center of said disk.

20. The reloadable film canister recited in claim 13, and further comprising a sensor disposed in operative relationship with said shell and said disk, said sensor being adapted to reproduce signals indicative of the rotary position of said core.

21. The reloadable film canister recited in claim 16, and further comprising a sensor disposed in operative relationship with said shell and said disk, said sensor being adapted to produce signals indicative of the rotary position of said core.

22. The reloadable film canister recited in claim 13, and further comprising a sensor disposed in operative relationship with said shell and said disk, said sensor being adapted to produce signals indicative of the rotary position of said core.

23. The reloadable film canister recited in claim 19, and further comprising a sensor disposed in operative relationship with said shell and said disk, said sensor being adapted to produce signals indicative of the rotary position of said core.

24. A system for determining the length of film remaining in a reloadable film canister, said system comprising:
- a light-tight enclosure shell having a film output slot;
- a spool core adapted to hold a quantity of film wound thereon forming a film roll, and rotatably mounted within said shell;
- bearing means facilitating free rotation of said core within said shell;
- sensor means;
- a spool disk having at least one element thereon detectable by said sensor;
- means for coupling said disk to said core for rotation therewith;
- said sensor means being external of said enclosure shell and being adapted to detect rotation of said core and disk and to provide a signal indicative of the position of said disk;
- film feed-metering means for precisely extracting a length of film from said canister;
- computation and control means for providing a feed length control signal to said film feed-metering means, for determining, from the disk position signal in conjunction with said feed length control signal, the diameter of the film roll, and the length of film remaining in said shell, and for determining when the canister is empty;
- wherein said film-metering means comprises a stepper motor coupled to a roller which drives the film from said canister, said roller having a calibrated circumferential length whereby each full rotation of said roller, or partial rotation corresponding to a discrete number of steps of said stepper motor, provides a precise value of the length of film fed from said canister;
- wherein said computation and control means further includes film-out detector means for determining when the film on said spool has been expended, said film detector means generating a film out signal indicative of the end of available film in said shell; and
- means responsive to said film out signal for stopping use of the film from said canister.

25. The system recited in claim 24, and further comprising visual display means for displaying the length of film remaining in said shell.

26. The system recited in claim 24, wherein said film out detector means generates said film out signal when said film-metering means is driven to feed film but said sensor means provides no signal indicating motion of said disk.

27. The system recited in claim 24 and further comprising:
- a signal output from said computation and control means indicative of the length of film remaining in said shell; and
- means for applying said length of film remaining signal to said film out detector means;
- said stopping means operating when the calculated length of film remaining goes to a predetermined minimum value.

* * * * *